United States Patent
Glazer et al.

(10) Patent No.: US 9,569,557 B2
(45) Date of Patent: Feb. 14, 2017

(54) CACHE MANAGEMENT IN HTML EREADING APPLICATION

(75) Inventors: Arieh Glazer, Migdal Haemek (IL); Ohad Eder-Pressman, San Francisco, CA (US); Vincent Le Chevalier, San Jose, CA (US); Charles F. Geiger, San Jose, CA (US)

(73) Assignee: Chegg, Inc., Santa Clara, CA (US)

(*) Notice: Subject to any disclaimer, the term of this patent is extended or adjusted under 35 U.S.C. 154(b) by 1010 days.

(21) Appl. No.: 13/461,499

(22) Filed: May 1, 2012

(65) Prior Publication Data
US 2013/0174016 A1 Jul. 4, 2013

Related U.S. Application Data

(60) Provisional application No. 61/581,557, filed on Dec. 29, 2011.

(51) Int. Cl.
*G06F 17/00* (2006.01)
*G06F 17/30* (2006.01)

(52) U.S. Cl.
CPC .............. *G06F 17/30902* (2013.01)

(58) Field of Classification Search
CPC .............. G06F 9/4443; G06F 17/30902
USPC ...................................................... 715/234
See application file for complete search history.

(56) References Cited

U.S. PATENT DOCUMENTS

| | | | | |
|---|---|---|---|---|
| 6,311,180 B1* | 10/2001 | Fogarty | ............. | G06F 17/30905 707/749 |
| 6,769,015 B1* | 7/2004 | Bates | ............. | G06Q 10/107 709/206 |
| 7,908,567 B1* | 3/2011 | Bhojan | ............. | G06F 3/0481 715/711 |
| 8,522,130 B1* | 8/2013 | Gilead | ............. | G06F 17/30014 715/230 |
| 8,627,199 B1* | 1/2014 | Handley | ............. | G06F 9/45529 715/234 |
| 8,990,685 B1* | 3/2015 | Sandoval | ............. | G06F 17/30899 715/208 |
| 2003/0046401 A1* | 3/2003 | Abbott | ............. | G06F 9/4443 709/228 |
| 2005/0021784 A1* | 1/2005 | Prehofer | ............. | H04L 29/06 709/229 |
| 2005/0155033 A1* | 7/2005 | Luoffo | ............. | G06F 9/5088 718/104 |
| 2006/0064495 A1* | 3/2006 | Tu | ............. | H04N 7/163 709/228 |

(Continued)

OTHER PUBLICATIONS

Magic Scroll—A Beautiful Online HTML5 EPUB Book Reader, MakeUseOf.com, Sep 25, 2011, pp. 1-5 http://www.makeuseof.com/tag/magic-scroll-beautiful-online-html5-epub-book-reader/.*

*Primary Examiner* — Scott Baderman
*Assistant Examiner* — Mario M Velez-Lopez
(74) *Attorney, Agent, or Firm* — Fenwick & West LLP (57) ABSTRACT

Embodiments of the invention provide a system and a method for providing consistent user experience in eReading applications. The system extracts a set of attributes of browsers and platforms on which an eReading application is running. The system receives a target eReading application performance. The system adjusts behavior of the eReading application to compensate for the difference between the extracted set of attributes and the target eReading application performance.

17 Claims, 7 Drawing Sheets

(56) References Cited

U.S. PATENT DOCUMENTS

| | | | | |
|---|---|---|---|---|
| 2010/0332431 | A1* | 12/2010 | Ribiere | H04L 67/306 706/14 |
| 2011/0154212 | A1* | 6/2011 | Gharpure | G06F 17/30867 715/738 |
| 2012/0296746 | A1* | 11/2012 | Bleadall | G06F 17/30637 705/14.66 |
| 2013/0080910 | A1* | 3/2013 | Bingell | G06F 3/048 715/744 |
| 2013/0174033 | A1* | 7/2013 | Hanukaev | G06F 3/0488 715/273 |
| 2013/0174272 | A1* | 7/2013 | Chevalier | G06F 21/10 726/28 |

\* cited by examiner

CACHE MANAGEMENT IN HTML EREADING APPLICATION

CROSS-REFERENCE TO RELATED APPLICATION

This application claims the benefit under 35 U.S.C. §119 (e) of Provisional Application No. 61/581,557, filed Dec. 29, 2011, which is incorporated by reference in its entirety.

This application is related to U.S. patent application Ser. No. 13/253,011, which is incorporated by reference in its entirety.

BACKGROUND

1. Field of the Invention

This invention relates to a publishing platform for aggregating, managing, and delivering electronic content to connected consumer electronic devices.

2. Description of the Related Art

The education publishing industry faces a number of significant challenges to effectively delivering media and services through an on-line delivery network. These challenges center around four discrete phases:

1. Ingestion: A lack of digital textbook standardization, a plethora of incompatible formats, and a lack of integration and interoperability between publishers makes it difficult to ingest and aggregate a large volume of educational content efficiently and reliably.
2. Publishing: Significant transformation of education content needs to be undertaken to ensure that the content is suited to publish across a variety of client devices that users may use to access the content.
3. Distribution: In an electronic distribution environment, particular attention needs to be given to issues of content protection and rights management, as well as service policies and quality of service, so that content providers are fairly compensated and users of the content perceive the value and reliability of the service.
4. Connected Services: In an educational platform, there exists the potential to deliver a rich user experience that extends beyond electronic access to textbooks. To implement such connected services would require complex business rules and content models that are unavailable in existing education digital publishing services.

Effectively enabling and managing each of the above four phases has not yet been accomplished by the education publishing industry. Accordingly, this has inhibited the growth of delivering media and services through an on-line delivery network.

SUMMARY

Embodiments of the invention provide a system and a method for providing consistent user experience in eReading applications. The system extracts a set of attributes of browsers and platforms on which an eReading application is running. The system then receives a target eReading application performance. The system adjusts behavior of the eReading application to compensate for the difference between the extracted set of attributes and the target eReading application performance.

In various embodiments, the set of attributes include at least one of: synchronous and asynchronous access speed, memory size, system and browser engine reliability, memory authorization mode, and fault tolerance level. The target performance is represented by at least one of: a set of performance parameters, a function of performance parameters, and a mapping between a number of performance levels and corresponding performance parameters. The performance parameters include at least one of: processor speed, memory size, and caching schemes.

Embodiments of the invention also provide a system and a method for managing cache in an eReading application. The system receives a target level of user experience for the eReading application. The system determines a set of properties of a document to be displayed by the eReading application. The system then determines a set of parameters that based on the received target level of user experience and document properties. The system allocates resources based on the determined set of parameters of the eReading application.

In various embodiments, the target level of user experience is a rank of performance levels from low to high determined by at least one of: synchronous and asynchronous access speed, memory size, system and browser engine reliability, memory authorization mode, and fault tolerance level. The set of document properties include at least one of: book metadata, page quality, font type and size, and image quality and size. The set of parameters include at least one of: processor speed, memory size, and caching schemes.

In various embodiments, the system also tunes the set of parameters for another different target level of user experience. The system adjusts the set of parameters for another document that has a different set of properties. The system may also predownload one or more document pages to be displayed by the eReading application, and store the predownloaded document pages in a cache. The predownloaded document pages including page, font, and image data are indexed by a hierarchy of multiple namespace levels in the cache.

One skilled in the art will readily recognize from the following discussion that alternative embodiments of the structures and methods illustrated herein may be employed without departing from the principles of the invention described herein.

DETAILED DESCRIPTION OF THE EMBODIMENTS

The successful and rapid growing adoption of electronic books and web based publishing services have confirmed that consumers of a wide distribution of gender and age around world are ready to migrate from print to digital content. Book publishers and content providers have embraced this trend by elevating their business models and making their ever growing content library available to a wide spectrum of user devices across multiple platforms.

The current eBook commercial success is due in a large part to the adoption of ePUB, the open eBook standard by the International Digital Publishing Platform (IDPF). The ePUB format, with its embedded metadata and single file packaging approach, has proven to be a good solution for easy distribution and off-line reading. However, for certain categories of books, such as textbooks, education, travel, art and cooking books, whose images, graphs, tables, maps, proprietary fonts, and multicolumns of text are assembled into complex sets of customized publications, converting into ePUB format and optimizing content presentation of book pages can be quite challenging. It is, therefore, highly desirable to have a HTML eReading application that provides unified user experience across the wide spectrum of user devices built upon different software and hardware platforms.

The goal of embodiments of cache management in HTML eReading application is to describe a system and method for managing and optimizing the content delivery of pages of books, textbooks and other copyrighted material into multiplatform web browser architecture for desktop, mobile and other tablet devices. In contrast to the ePUB books or PDF documents, which need to be downloaded and extracted entirely before being available to proprietary eReader applications, the content in modern markup language format can be downloaded to general eReader applications (e.g., a HTML5 compatible browser) on a page by page basis, hence lowering the risk of having the entire book or document cached by the eReader applications. Embodiments of the cache management leverage the platform overall understanding of the document metadata and page layout information into a modern publishing platform for the distribution and commercialization of copyrighted documents across multi-platform environments.

Platform Overview

Figure 1:
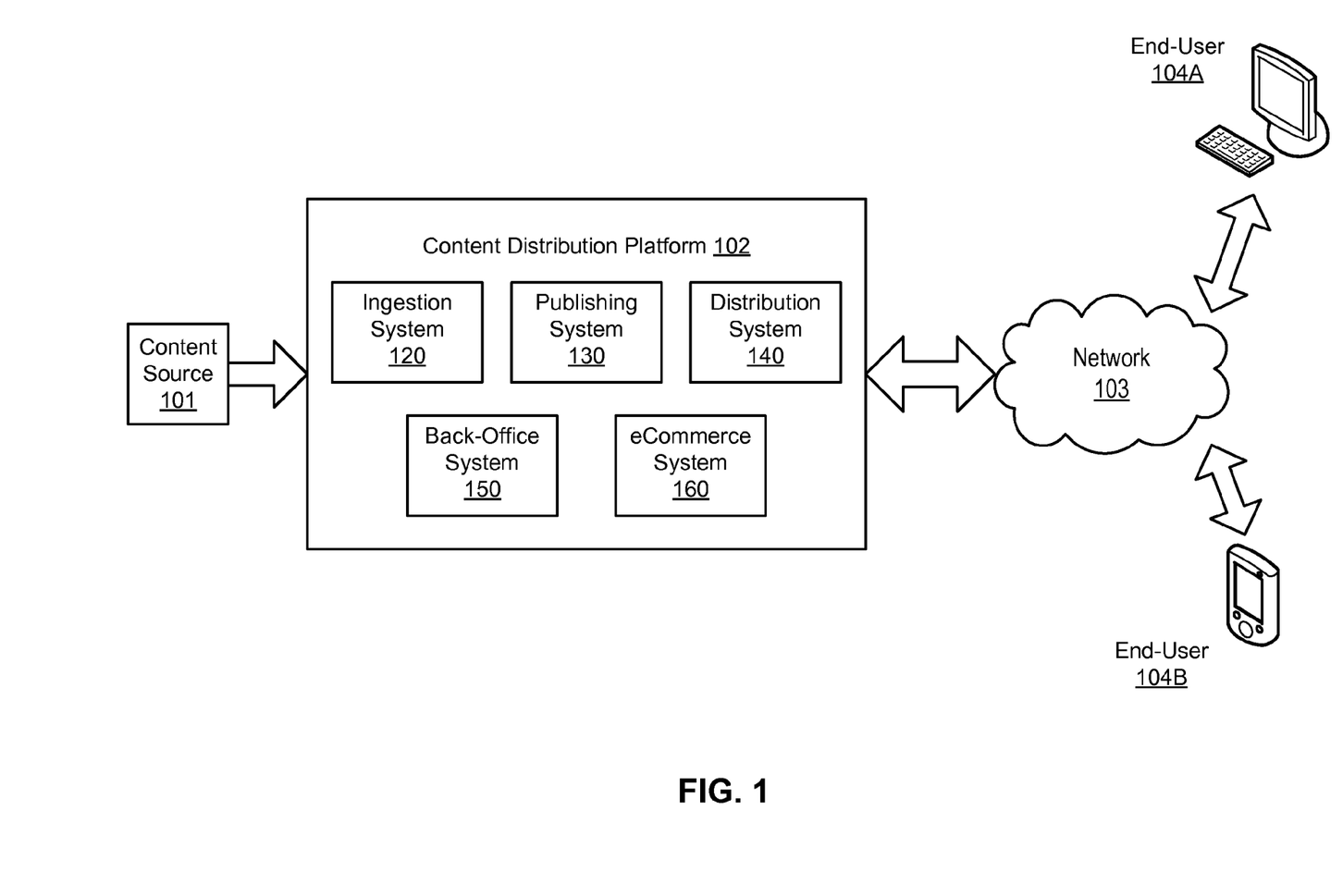
FIG. 1 is a high-level block diagram illustrating a digital content distribution platform, in accordance with an embodiment of the invention.

FIG. 1 illustrates a block diagram of a system environment for a digital content delivery and online education services. The system environment facilitates flexible distributions of digital books from publishers to end users. The content distribution platform 102 is described in more detail in patent application U.S. Ser. No. 13/253,011 titled "Electronic Content Management and Delivery Platform" filed on Oct. 4, 2011, the disclosure of which is incorporated herein by reference in its entirety.

As shown in FIG. 1, the digital reading environment comprises a content source 101, a content distribution platform 102, a network 103, and one or more clients 104. The content source 101 includes digital and printed content automatically gathered and aggregated from a large number of publishers, categories, and partners. Examples of content include textbooks, trade books, magazines, newspapers, user-generated content, web content, and advertising content.

The content distribution platform 102 aggregates, validates, transforms, packages, and monetizes the content collected by the content source 101 into a number of business services, prior to distribution to the clients 104 over the network 103. The platform comprises five systems: an ingestion system 120, a publishing system 130, a distribution system 140, a back-office system 150, and an eCommerce system 160.

The ingestion system 120 first gathers information on the type, file formats, and file manifest of the content. The ingestion system then checks files' integrity and conformity to standards, such as PDF, ePUB2, ePUB3, XML, HTML, and other formats. Content files that fail the integrity and conformity checks are flagged for further testing and repairing. Each content file that passes the checks is assigned a unique identifier and stored in a database for access by the publishing system 130.

The publishing system 130 converts ingested documents into markup language documents, for example, an HTML5 web page with enhanced metadata, which is well-suited to distribution across a wide variety of computing devices connected to the content distribution platform 102 via the network 103. Due to the original format of the source content and the complexity of the layout of the original document, the converted markup language documents are tested by the publishing system 130 to determine whether the conversion preserves the page fidelity compared to the original printed document. The page fidelity includes the original page structure, such as the pagination of the original printed document, the number of columns and arrangement of paragraphs, the placement and appearance of graphics, titles and captions, and the fonts used. Only converted documents that meet a minimum requirement of page fidelity are approved for distribution.

The distribution system 140 packages the content for delivery and uploads the content to content distribution networks. Then, the distribution system 140 makes the content available to end-users based on the content's digital rights management policies. More details of the publishing system 140 are described with reference to FIG. 2 below.

The back-office system 150 handles tasks dedicated to running business within the content distribution platform, such as accounting, human resource, and project management. The back-office system 150 also manages the interactions with customers, clients, and sales.

The eCommerce system 160 manages the online processes of marketing, selling, servicing and receiving payments for digital products and services. Hence the eCommerce system 160 is closely interfaced to the publishing system 130, distribution system 140, as well as the back-office system 150.

The network 103 facilitates content and service distribution and communications between various components of the system environment. Contents are packaged and distributed across the network 103 for client consumption. The overall quality of service received by the clients is also monitored and reported back to the content distribution platform 102 over the network 103. The network 103 is typically a content delivery network (CDN) built on the Internet, but may include any network, including but not limited to a LAN, a MAN, a WAN, a mobile wired or wireless network, a private network, or a virtual private network.

The clients 104 access the content from web browsers on computing devices connected to the network 103. The computing devices include a personal computer, such as a desktop, laptop, or tablet computer, a personal digital assistant, a mobile or smart phone, or a television "set-top box" using a client web application. The educational content are transformed by the content distribution platform 102 and delivered to the clients 104 across the network 103. As the clients enjoy the consistent reading experiences and high-quality services, the web browsers on the clients' devices regularly communicate with the content distribution platform 102 for updating reading content and connected services. In addition, user data on the clients' experience with the service and quality of the network connections are also collected and uploaded to the content distribution platform 102 through network 103.

In contrast to existing digital publishing services, such as AMAZON KINDLE®, the disclosed content distribution platform does not require users to purchase a specific client device or download a standalone application from the service provider to access the content. Rather, any HTML5 compatible browser on a user's computing device may receive, from the content distribution platform 102, structureless HTML5 page elements to construct pages of a document on the browser, along with a host of document specific metadata to enhance the user's reading experience with the document, such as thumbnail navigation and an interactive table of contents. The HTML5 pages of the document also supports a number of reading activities, such as creating highlights, taking notes, and accessing a dictionary Annotations, such as highlights, drawings, notes, comments, and other personalized data created by the user can be displayed as an overlay on the original content, stored and archived in the user account, synchronized across all registered devices of the user, and optionally shared among the user's friends, classmates, campus, or other groups, as part of an education social platform.

By having content served dynamically and mostly on-demand, the content distribution and protection platform is effectively authorizing the download of one page or one block of pages of content at a time through time sensitive dedicated URLs which only stay valid for a short period of time under control of the service provider. It is noted that although embodiments of the invention are described herein with reference to HTML5, other markup languages with suitable characteristics may also be used in place of HTML5.

eReading Application

Figure 2:
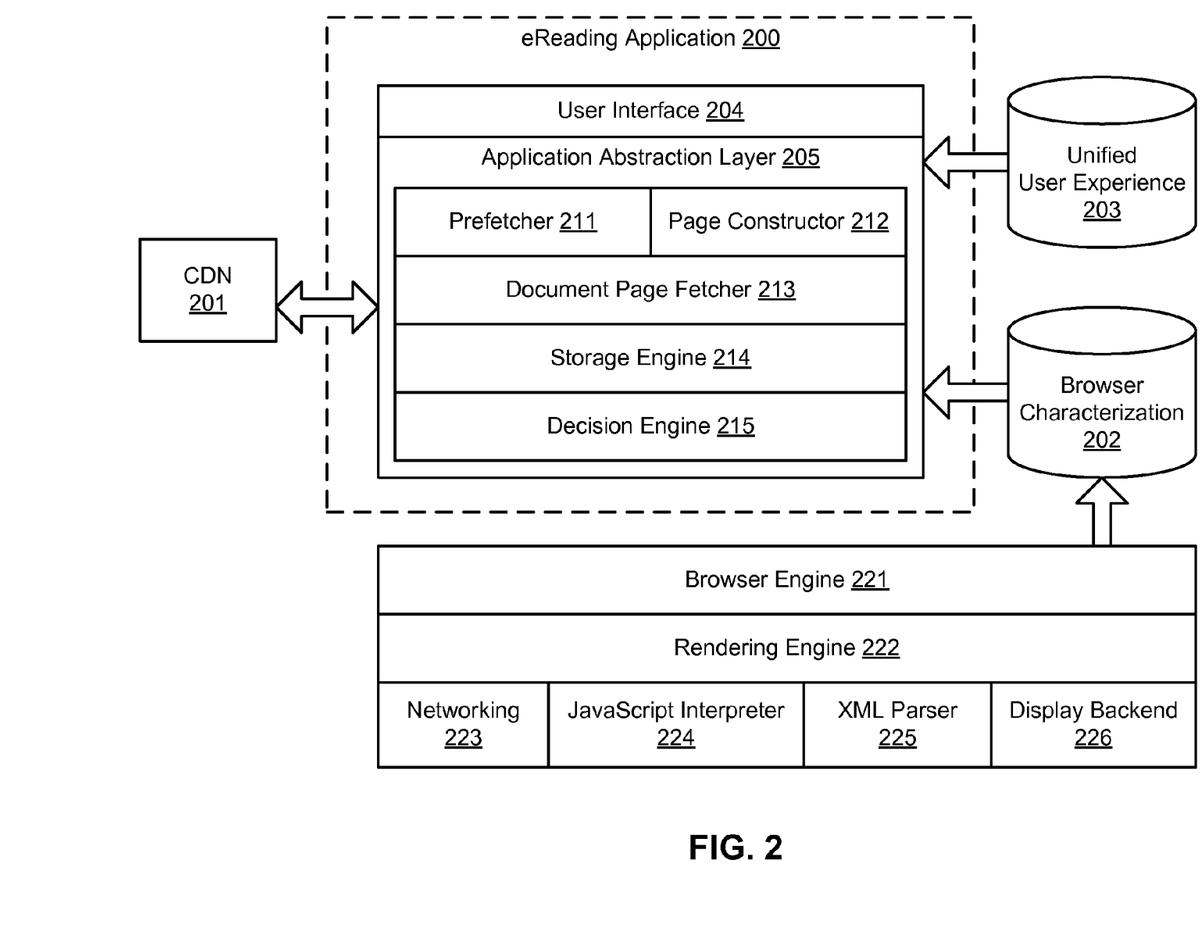
FIG. 2 is a block diagram illustrating an eReading application embedded within a web browser, in accordance with an embodiment of the invention.

Embodiments of the present invention provide browser based eReading applications that are embedded or plugged into HTML5 compatible web browsers, and as such are interfaced directly within the browsers' stack and architecture. FIG. 2 is a block diagram illustrating an eReading application 200 embedded within a web browser in accordance with an embodiment of the invention. The eReading application 200 comprises a browser characterization data store 202, a unified user experience data store 203, a user interface 204, and an application abstraction layer 205. The eReading application 200 also interacts with a CDN 201 (e.g., network 103 in FIG. 1) and a browser engine 221. The browser engine 221 is part of the web browser in which the eReading application 200 is embedded. The web browser also includes a rendering engine 222 and four additional modules: a networking module 223, a JavaScript interpreter 224, an XML parser 225, and a display backend 226.

The browser characterization data store 202 stores data about performance and capabilities of different browsers, upon which the eReading application resides. The performance of HTML5 browsers can be measured in real time on an on-going basis, including attributes such as downloading speed, page rendering speed, memory size, reliability, authorization mode for resource relocation, and fault tolerance. The performance of browsers can also be evaluated offline, for example, as part of the publishing platform automated testing system.

The unified user experience data store 203 stores data about target browser performance corresponding to unified user experience. In one embodiment, the target performance can be represented as a set of browser attributes includes the page loading speed, memory seize, and fault tolerance level. Alternatively, the unified eReading experience can be defined as a weighted combination or a function of these attributes. Further, the unified eReading experience can be a mapping between different performance levels and sets of browser performance parameters.

The user interface 204 defines the interactions between the eReading application 200 and the users of the application. It includes menu, toolbars and widgets that support various user reading activities including annotations, bookmarks, preference configurations, visual page-load progress, smart downloading, and printing. The user interface 203 delivers the user experience of the eReading services provided by the application abstraction layer 204.

The application abstraction layer 205 aims at providing consistent user eReading experience across multiple HTML5 browser implementations. Since browsers are designed and implemented with different characteristics, the performance of the browsers is often significantly distinctive from one to another. In addition, a given browser may have various supporting rendering and storage engines implemented for different operating systems. Therefore, it is necessary in some embodiments to abstract specificities and features of various browsers in order to align their capabilities to the desired user experience. The application abstraction layer 205 accordingly adjusts performance parameters of browsers to provide a consistent user experience. For example, on an older and slower platform, the application abstraction layer 205 may compensate and optimize the performance parameters of the browser by allocating more buffer space (e.g., memory or storage space) for page cache. The benefit of this browser performance abstraction is to provide the highest possible quality of eReading service and consistent user experience across multi-platform eReading devices with different HTML5 browser implementations.

The application abstraction layer 205 includes five components, namely a prefetcher 211, a page constructor module 212, a document page fetcher 213, a storage engine 214 and a decision engine 215. As shown in FIG. 2, the application abstraction layer 205 is part of the eReading application 200 and resides on top of the browser engine 221. The application abstract layer 205 interfaces with the user interface 204 to provide consistent user experience across various environments. The components of the application abstract layer 205 are described in more detail below.

The underlying browser can include the browser engine 221, which interfaces with the rendering engine 222. The browser engine 221 downloads content from a given URL provided by the eReading content distribution system, and supports user navigation actions, such as forward and backward. As described above, the browser performance and capabilities can be monitored in real-time on an on-going basis. In one embodiment, the performance parameters are monitored and collected by the browser engine 221. The result is defined as browser characteristics and stored in the browser characterization data store 202.

The rendering engine 222 produces the visual representation of a document page downloaded from the given URL. It parses and renders the HTML or XML document page styled by cascading style sheets (CSS), as well as embedded images, tables, and videos. The rendering engine 222 also presents the exact page layout based on page fidelity metadata.

The rendering engine 222 interacts directly with four underlying modules, namely, the networking module 213, the JavaScript interpreter 224, the XML parser 225, and the display backend 226, to communicate with web servers, execute downloaded program code, and drive the host operating system. The networking module 223 implements the hypertext transfer protocol (HTTP) used by the browser to communicate with the content distribution servers of the publishing platform. The networking module 223 also resolves multipurpose Internet mail extensions (MIME) media file types and translates between different character sets. The JavaScript interpreter 224 evaluates JavaScript code, which might be embedded within document pages. The XML parser 225 parses XML documents into a document object model (DOM). The display backend 226 provides drawing and windowing primitives, user interface widgets, and fonts to the browser.

Document Page Retrieval

Figure 3:
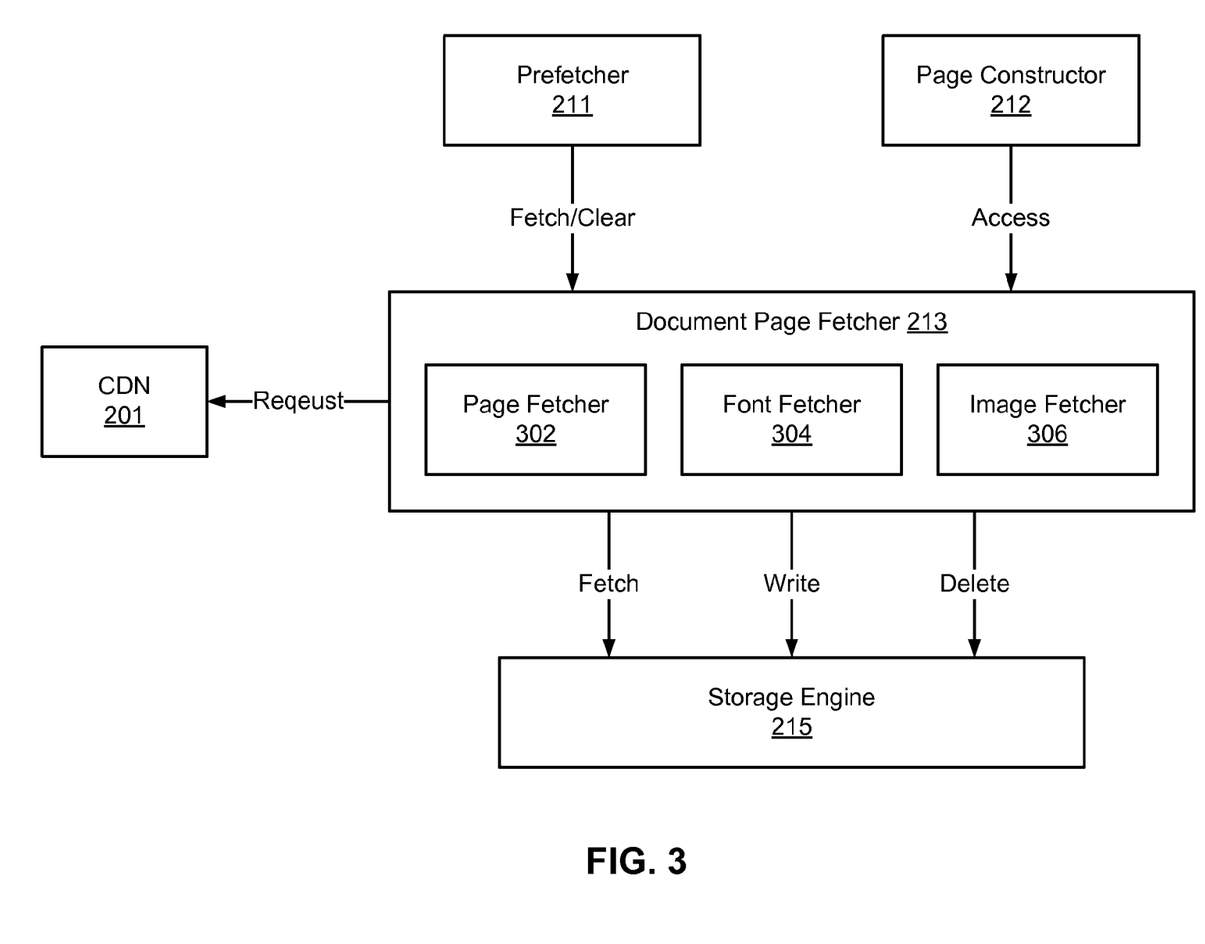
FIG. 3 is a block diagram illustrating a data management subsystem in the eReading browser application, in accordance with an embodiment of the invention.

FIG. 3 is a block diagram illustrating an example of document page retrieval components and operations in the application abstraction layer 205 of the eReading application. The main document data managing and consuming modules in the application abstract layer 205 are the prefetcher 211 and the page constructor 212. Both the prefetcher 211 and the page constructor 212 request live data from servers in CDN 201 and cached data from storage engine 215 the document page fetcher 213. The received document data from the CDN 201 is categorized into various elements of the document pages, such as page data, font data and image data, and cached separately by the storage engine 215. These page elements can be accessed by a page fetcher 302, a font fetcher 304, and an image fetcher 306 in the document page fetcher layer 213, respectively.

In one embodiment, the page fetcher 302, the font fetcher 304, and the image fetcher 306 in the document page fetcher layer 213 are designated modules handling the corresponding data elements. These data fetchers each can fetch, write, and delete data from its own storage solutions, either local cache or database. When the page constructor 212 needs to access a page, it calls the document page fetcher 213. The document page fetcher 213 checks if the page data is available in the cache. If so, the document page fetcher 213 fetches the page data for the page constructor 212. Otherwise, the document page fetcher 213 requests the page data from servers in the CDN 201 and passes the page data to the page constructor 212. The document page fetcher 213 also determines whether or not to save the page data. This page data fetching is transparent to the page constructor 212, i.e., the page constructor 212 is not aware the source of the page data and the online status of the eReading application.

In one embodiment, the eReading application uses the prefetcher 211 to speed up page loading time. The prefetcher 211 ensures sufficient page data are pre-fetched and cached to serve the page constructor 212, so as to provide smooth book reading experience. The prefetcher is also the entity in charge of clearing outdated data from the cache. The prefetcher operations are supported by the various data fetchers in the document page fetcher 213.

Cache Management System

For fast access, the eReading application is caching the book data and the page data on local storage, using a namespace scheme for easy access and maintenance. For all other type of data, including fonts and images for example, the eReading application uses a database layer that accepts different database drivers, to allow switching between various browser-database implementations.

To allow greater control and reusability, in one embodiment, the cache management system is storing each of the data units as a separate key. By this method, every page, font, and image will be saved separately, sometimes on different databases, in order to make sure that the cache management system is maximizing the storage size, as well as keeping the ability to maintain the cache size as efficiently as possible.

Figure 4:
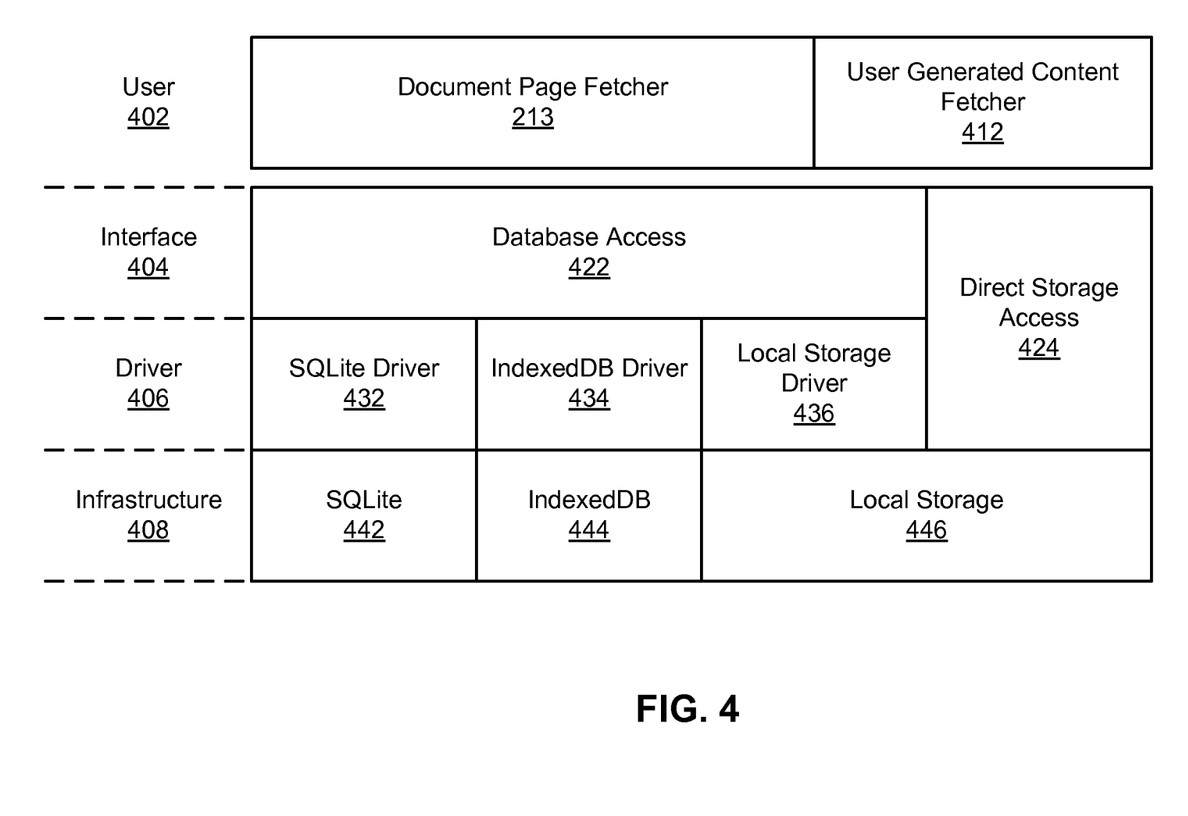
FIG. 4 is a block diagram illustrating a storage subsystem in the eReading browser application, in accordance with an embodiment of the invention.

FIG. 4 is a block diagram illustrating an example cache management system of the eReading application. The cache management system spans four layers from bottom to top, namely: an infrastructure layer 408 containing underlying databases that cache content for the eReading application, a driver layer 406 with database drivers and APIs for accessing the browser databases through the infrastructure layer, a interface layer 404 that provides data access to the users in a user layer 402, and the user layer 402 that represents various clients of the data storage engine, such as the document page fetcher 213 and a user generated content fetcher 412.

The infrastructure layer 408 contains database implementations such as a SQLite 442 and an IndexedDB 444, which can be accessed by the user layer 402 through a database access module 422 in the interface layer 404 and corresponding SQLite driver 432 and IndexedDB driver 434 in the driver layer 406. A faster way to store and retrieve data is by utilizing a local storage component 446, which is a memory or disk cache allocated specifically for the browser. Similarly, the local storage 446 can be accessed through the database access 422 and corresponding local storage driver 436. In addition, the direct storage access 424 provides a direct access path to the local storage 446 for the users.

Conventional local storage design is key-based, therefore can be hard to maintain complex collections of data. For example, a local storage needs to store data of many different subsets for complex web applications. However, APIs provided by the local storage often do not support sub-collections of data, grouping of data pieces, or defining data order. These limitations make it very hard to search and iterate data stored in the local storage.

To address these limitations, the eReading application augments the data keys with "namespaces" when storing the data in the local storage 446. For example, page data is indexed by keys with namespace like "pages.data.{page_id}." This way, the eReading application identifies data components from each other. However, the search is linear, i.e., the eReading application still needs to iterate through the entire local storage to locate a specific key. To optimize the searching, the local storage 446 organize the cached data in a hierarchy of multiple namespace levels, each namespace level corresponds to a data collection manipulated as a data object. The hierarchical data collections introduce data-grouping as well as a faster search and iterate mechanism within the local storage 446. For example, a data collection can be created with a namespace of "PageData", which may include a sub-collection called "PageData.extra", which in turn may have its own sub-keys and sub-collections.

Since all the data collections are stored on one global stack of the local storage 446, each namespace represents exactly one data collection. Therefore, when the document page fetcher 213 accesses a page (e.g., through the database access 422 and local storage driver 436, or the direct storage access 424), it does not need to look for it or create a copy of it as the data object can be accessed in a transparent manner and data duplication is avoided.

Although relatively faster, the local storage 446 only allows for a limited amount of space as all browsers have memory limitation. In order to store larger amounts of data, as required by the large amount of content in complex documents, the cache management system also utilizes cache databases such as the SQLite 442 and IndexedDB 444.

As mentioned above, these database implementations are accessed through their respective drivers. To provide a unified application architecture and deployment, the cache management system implements the database access module 422, which is an abstraction layer that accommodates various drivers. The database access 422 minimizes the interactions between the users (e.g., the document page fetcher 213) and various database drivers (e.g., SQLite driver 432) to a single point, therefore simplifies the application design and improves the software quality. It also allows the eReading application to choose between multiple implementations if the browser supports more than one database implementations.

Decision Engine

Referring again to FIG. 2, the decision engine 215 in the application abstraction layer 205 leverages pre-processed browser characterizations (e.g., stored in the browser characterization store 202) to optimize the browser performance attributes to align the performance with the unified user experience target (e.g., stored in the unified user experience store 203) of the eReading application. As described above, browser characterizations can be done on client devices and/or servers in the CDN 201 (e.g., as a process integrated into content automated testing). The characterization process monitors various performance parameters, such as speed (asynchronous or synchronous), memory size, reliability, memory increase authorization mechanism, and fault tolerance.

As new browsers and client platforms are released on a frequent basis, new characterizations can be added as reference for the eReading application abstraction layers. In addition, a given browser may implement multiple storage engines with different characteristics. The eReading application optimizes the performance parameters across all user experience parameters to compensate for the difference between the browser characteristics and the unified user experience target, so as to deliver consistent and unified user experience across multiple storage engine combinations and browser characterizations.

Figure 5:
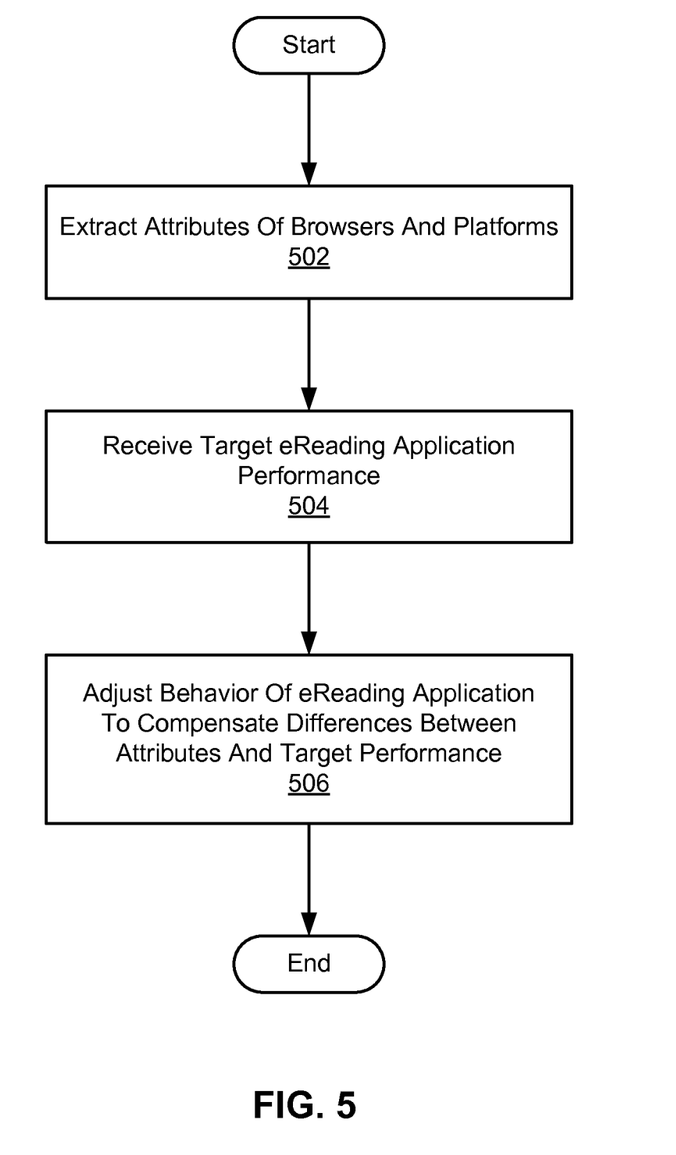
FIG. 5 is a flowchart illustrating a method for providing consistent user experience for an eReading application.

FIG. 5 is a flowchart illustrating a method for providing consistent user experience for an eReading application. First, a set of attributes of browsers and platforms on which the eReading application is running is extracted 502. In one embodiment, the attributes of the browsers and platforms include processor speed and memory size. The attributes can be represented by numbers (e.g., performance benchmarks for processors and megabytes for memory) or by relevant rankings (e.g., fast, medium, or slow for processor speed; and large, medium, and small for memory sizes).

The eReading application then receives 504 a target eReading application performance, which represents a consistent user experience for an eReading application. In one embodiment, the target performance is defined as a set of performance parameters, such as page loading speed, page quality, and fault tolerance level. Similarly, the performance parameters can be represented by numbers (e.g., average page loading time in seconds) or by rankings (e.g., high, medium, and low in page quality). Further, the target performance can be a weighted combination or a function of these parameters.

Afterward, the eReading application adjusts 506 behavior of the eReading application, such as cache size, memory allocation, and processor speed to compensate for the differences between the extracted attributes of the browsers and platforms and the target performance. The processor speed is crucial to the performance of page rendering and data fetching, and the memory or cache size affects the page loading speed. The adjustment of the eReading application behavior can optimize the performance of the eReading application and approximate the target performance as closely as possible to provide a consistent user experience for eReading across multiple browsers and platforms.

As an example, complex documents, such as textbooks, combine text, fonts, pictures and other graphic elements into publications which may include a large number of unique pages. Each page of these complex documents can be deconstructed into various elements including text content, customized fonts, graphic objects (e.g., images, tables and graphs), and layout information. As a result of the deconstruction, the total file size of the various elements in a document page can vary significantly from one page to another. For instance, a page with text content only is likely to be much smaller than a page containing a large color picture. Hence, on a publishing platform where content is delivered within a HTML5 browser with limited memory space, it is critical for the embedded eReading application to be able to adjust behavior accordingly.

In one embodiment, the eReader cache management can be programmed to limit the pre-fetching and caching of the document pages due to small cache size, and rely more on the live fetching to maintain the loading speed compensated by setting a higher processor power level. Alternatively, the eReading application cache management may lower the page quality and reduce the amount of content that is stored in the document object module (DOM) to match the memory limitation. Either adjustment of the behavior of the eReading application to compensate for the limited memory can avoid triggering paging to the client hard drive, which may result in overall system latency and user experience delays.

Figure 6:
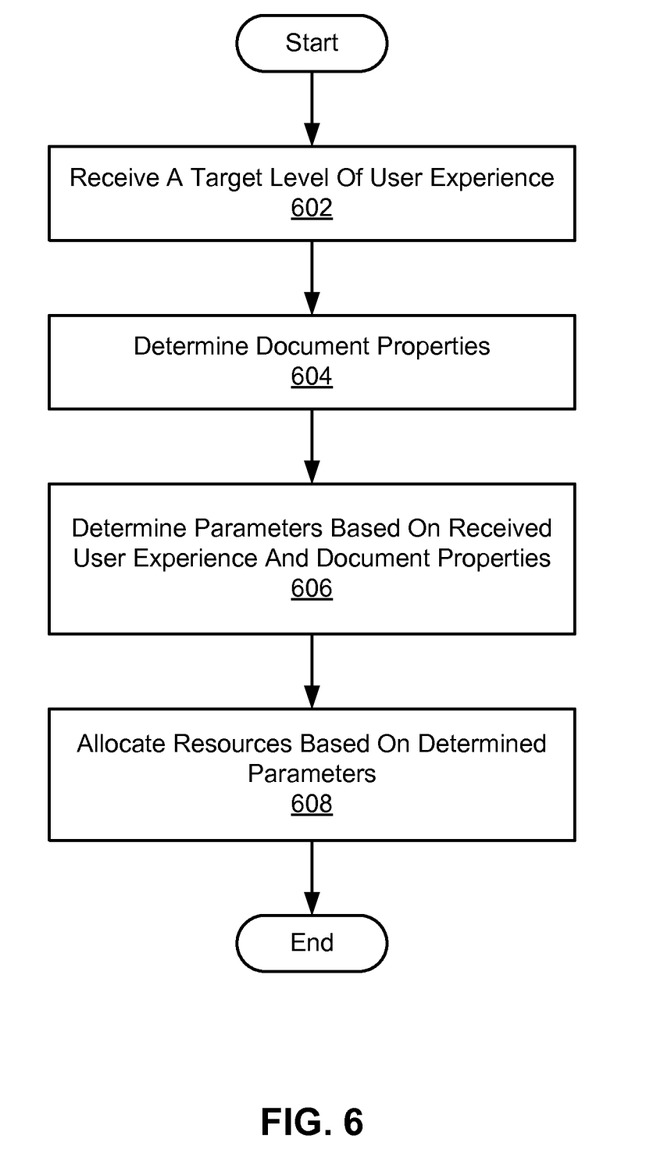
FIG. 6 is a flowchart illustrating a method for providing unified eReading experience based on document properties.

FIG. 6 is a flowchart illustrating a method for providing a unified eReading experience based on document properties. First, a target level of user experience of the eReading application is received 602. In one embodiment, the user experience of the eReading application is unified and defined by a series of performance rank, such as high, medium and low performance levels. The unified eReading experience can be mapped between the different performance levels and corresponding attributes of the browsers and platforms on which the eReading application is running. The attributes include processor speed and memory size, which are represented by relevant rankings, such as fast, medium, or slow for processor speed and large, medium, and small for memory size.

Figure 7:
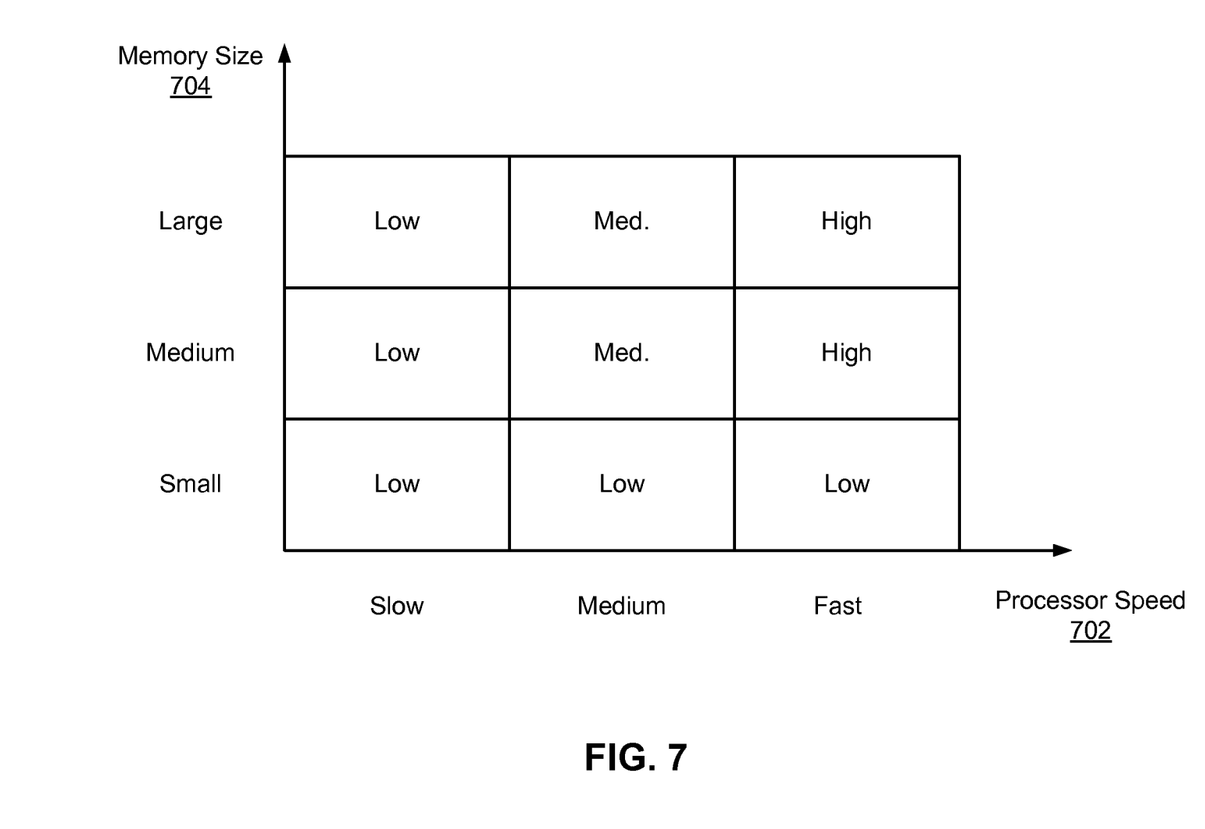
FIG. 7 is a table illustrating a mapping between performance attributes and user experience of the eReading application.

FIG. 7 is a table illustrating a mapping between the performance attributes of processor speed and memory size, and the user experience. In the illustrated embodiment, the user experience is defined as a plurality of performance levels: low, medium, and high. According to the mapping, a performance of at least a medium level may be obtained by any combination of a medium or fast processor speed with a medium or large processor.

Referring back to FIG. 6, a set of properties of the document to be displayed is then determined 604 by the eReading application. The document properties include book metadata, page quality, font type and size, and image size and quality. Next, based on the received target level of user experience and the document properties, a set of parameters is determined 606. The eReading application then allocates 608 resources including memory size and processor cycles based on the determined parameters for the eReading application. The eReading application can also adjust the set of performance parameters for a different user experience and/or for another document that has a different set of properties.

For example, assuming that the target user experience is high and the document page size is large due to high-resolution images contained, the user experience mapping in FIG. 7 mandates that either memory size is large or medium while the processor speed is fast. Since the document page size is large, the memory size for the eReading application has to maintain at large level. Therefore, to support the target user experience and the document in this example, the eReading application needs to allocate a large memory on a platform with a fast processor speed, so that a high eReading performance can be achieved.

In conclusion, embodiments of the invention described herein provide one of the key components—the embedded eReading application with cache management in delivering a consistent and unified user reading experience across multi-platform HTML5 browser platforms of various performance and characteristics. The eReading application interfaces between the content distribution servers and the client browsers on end-user devices. The eReading application deploys cache management based on browser characterization and user experience abstraction, and functions as a major system component in the publishing platform.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method of providing consistent user experience in eReading, the method comprising:
    receiving an indication of a target level of user experience for an eReading application;
    computing a target eReading application performance corresponding to the target level of user experience;
    extracting a set of attributes of browsers and platforms on which the eReading application is running;
    providing the target level of user experience by adjusting behavior of the eReading application to compensate for a difference between the extracted set of attributes and the target eReading application performance; and
    providing the target level of user experience for the eReading application, across a plurality of documents to be displayed by the eReading application, by, for each document of the plurality of documents:
        determining a set of properties of the document to be displayed by the eReading application;
        determining a set of cache management parameters based on the received target level of user experience and the set of document properties; and
        providing the target level of user experience for the document by allocating cache resources used for display of the document by the eReading application, the allocating based on the determined set of cache management parameters.

2. The method of claim 1, wherein the target level of user experience is a rank of performance levels from low to high determined by at least one of: synchronous and asynchronous access speed, memory size, system and browser engine reliability, memory authorization mode, and fault tolerance level.

3. The method of claim 1, wherein the set of document properties include at least one of: book metadata, page quality, font type and size, and image quality and size.

4. The method of claim 1, wherein the set of cache management parameters include at least one of: processor speed, memory size, and caching schemes.

5. The method of claim 1, further comprising tuning the set of cache management parameters for another different target level of user experience.

6. The method of claim 1, further comprising adjusting the set of cache management parameters for another document that has a different set of properties.

7. The method of claim 1, further comprising:
predownloading one or more document pages to be displayed by the eReading application; and
storing the predownloaded document pages in a cache.

8. The method of claim 7, wherein the predownloaded document pages including page, font, and image data are indexed by a hierarchy of multiple namespace levels in the cache.

9. The method of claim 1, wherein:
the determined set of cache management parameters correspond to available processor resources; and
providing the target level of user experience for the document by allocating cache resources comprises optimizing a quality and a quantity of display content of the document pre-fetched into cache memory in accordance with the available processor resources.

10. A non-transitory computer-readable storage medium storing executable computer program instructions for providing consistent user experience in eReading, the computer program instructions comprising instructions for:
receiving an indication of a target level of user experience for an eReading application;
computing a target eReading application performance corresponding to the target level of user experience;
extracting a set of attributes of browsers and platforms on which the eReading application is running;
providing the target level of user experience by adjusting behavior of the eReading application to compensate for a difference between the extracted set of attributes and the target eReading application performance; and
providing the target level of user experience for the eReading application, across a plurality of documents to be displayed by the eReading application, by, for each document of the plurality of documents:
determining a set of properties of the document to be displayed by the eReading application;
determining a set of cache management parameters based on the received target level of user experience and the set of document properties; and
providing the target level of user experience for the document by allocating cache resources used for display of the document by the eReading application, the allocating based on the determined set of cache management parameters.

11. The storage medium of claim 10, wherein the target level of user experience is a rank of performance levels from low to high determined by at least one of: synchronous and asynchronous access speed, memory size, system and browser engine reliability, memory authorization mode, and fault tolerance level.

12. The storage medium of claim 10, wherein the set of document properties include at least one of: book metadata, page quality, font type and size, and image quality and size.

13. The storage medium of claim 10, wherein the set of cache management parameters include at least one of: processor speed, memory size, and caching schemes.

14. The storage medium of claim 10, wherein the computer program instructions further comprises instructions for tuning the set of cache management parameters for another different target level of user experience.

15. The storage medium of claim 10, wherein the computer program instructions further comprises instructions for adjusting the set of cache management parameters for another document that has a different set of properties.

16. The storage medium of claim 10, wherein the computer program instructions further comprises instructions for:
predownloading one or more document pages to be displayed by the eReading application; and
storing the predownloaded document pages in a cache.

17. The storage medium of claim 16, wherein the predownloaded document pages including page, font, and image data are indexed by a hierarchy of multiple namespace levels in the cache.

* * * * *